(12) United States Patent
Johnson et al.

(10) Patent No.: US 7,249,199 B2
(45) Date of Patent: Jul. 24, 2007

(54) NETWORK ROUTING USING A DRIVER THAT IS REGISTERED WITH BOTH OPERATING SYSTEM AND NETWORK PROCESSOR

(75) Inventors: Erik J. Johnson, Portland, OR (US); Aaron R. Kunze, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 366 days.

(21) Appl. No.: 10/931,307

(22) Filed: Aug. 31, 2004

(65) Prior Publication Data

US 2005/0055460 A1  Mar. 10, 2005

Related U.S. Application Data

(63) Continuation of application No. 09/594,352, filed on Jun. 14, 2000, now Pat. No. 6,789,131.

(51) Int. Cl.
  *G06F 15/16* (2006.01)
  *G06F 15/173* (2006.01)
(52) U.S. Cl. ............................... 709/250; 709/238
(58) Field of Classification Search ................ 709/250, 709/238, 230
See application file for complete search history.

(56) References Cited

U.S. PATENT DOCUMENTS

| 5,586,268 A | 12/1996 | Chen et al. |
| 5,872,956 A | 2/1999 | Beal et al. |
| 5,910,180 A | 6/1999 | Flory et al. |
| 6,393,495 B1 | 5/2002 | Flory et al. |
| 6,519,654 B1 | 2/2003 | Fang et al. |
| 6,959,439 B1* | 10/2005 | Boike .......................... 719/326 |
| 2002/0091863 A1* | 7/2002 | Schug ......................... 709/250 |

OTHER PUBLICATIONS

Beck et al., *Linux Kernel Internals*, ISBN 0201331438, Chapter 8, pp. 227-278, no date.
Rubini, *Linux Device Drivers*, ISBN 1565922921 (Table of Contents only), no date.
http://anchor.cs.binghamton.edu/courses/cs628/netdevice.html—Network Devices, no date.
http://www.microsoft.com/ddk/ddkdocs/win2k/502nwfeat_8jc7.htm—Supporting Network Drivers, no date.
http://www.tru64unix.compaq.com/faqs/publications/dev_doc/—Writing Network Device Drivers, no date.

* cited by examiner

Primary Examiner—Krisna Lim
(74) Attorney, Agent, or Firm—Fish & Richardson P.C.

(57) ABSTRACT

A method for employing a driver in a router to communicate between the router's operating system and network processor. The driver appears to the operating system as a device driver for a conventional network interface. The driver also registers with the network processor and appears itself as a forwarding interface. Control information received the network processor is forwarded to the operating system by way of the driver using the network processor's existing forwarding mechanisms, and control information from the operating system is sent to the network processor by way of the driver.

10 Claims, 5 Drawing Sheets

NETWORK ROUTING USING A DRIVER THAT IS REGISTERED WITH BOTH OPERATING SYSTEM AND NETWORK PROCESSOR

This application is a continuation (and claims the benefit of priority under 35 USC § 120) of U.S. patent application Ser. No. 09/594,352, filed on Jun. 14, 2000, now U.S. Pat. No. 6,789,131.

BACKGROUND

This invention relates to routing data on a computer network.

A typical computer network is collection of interconnected computers. Data, such as text, images, sounds and videos, are typically communicated over the network from a source computer to a destination computer in pieces referred to as "packets." In most networks, packets usually are not sent directly from the source to the destination, but rather are routed by intermediate nodes known as "routers."

Generally, there are two types of packets that a router may receive. First, a general data packet contains data for communication between two computers on the network. The router handles this type of data packet by forwarding the packet to the appropriate destination computer or next router as necessary.

Second, control information packets carry control information and are used by the router itself. Control information includes router-to-router communications and may also include administrative network commands. Changes of router configuration, such as management of communication ports and changing the internet protocol (IP) addresses of the router communication ports, as well as changes of network topology, are examples of control information. Good network performance requires fast packet forwarding, but rapid exchange of control information is less critical to network performance.

To improve the speed of packet forwarding, many routers employ network processors, which are specialized hardware devices designed to perform certain networking operations quickly. A network processor operates separately from the router's general-purpose processor and usually isolates the operating system on the general-purpose processor from the forwarding operations. A router's network processor typically has more limited, dedicated resources than the router's general-purpose processor.

DETAILED DESCRIPTION

The invention provides a non-invasive integration of network processors and operating systems. The invention is non-invasive in that the invention does not require any modifications to the operating system or to the network processor.

Although network processors have improved the speed of network routing, network processors still require the support of the operating system running on the general-purpose processor. In particular, many network processors are not equipped to handle control information, which must be handled by the operating system on the general-purpose processor.

Figure 1:
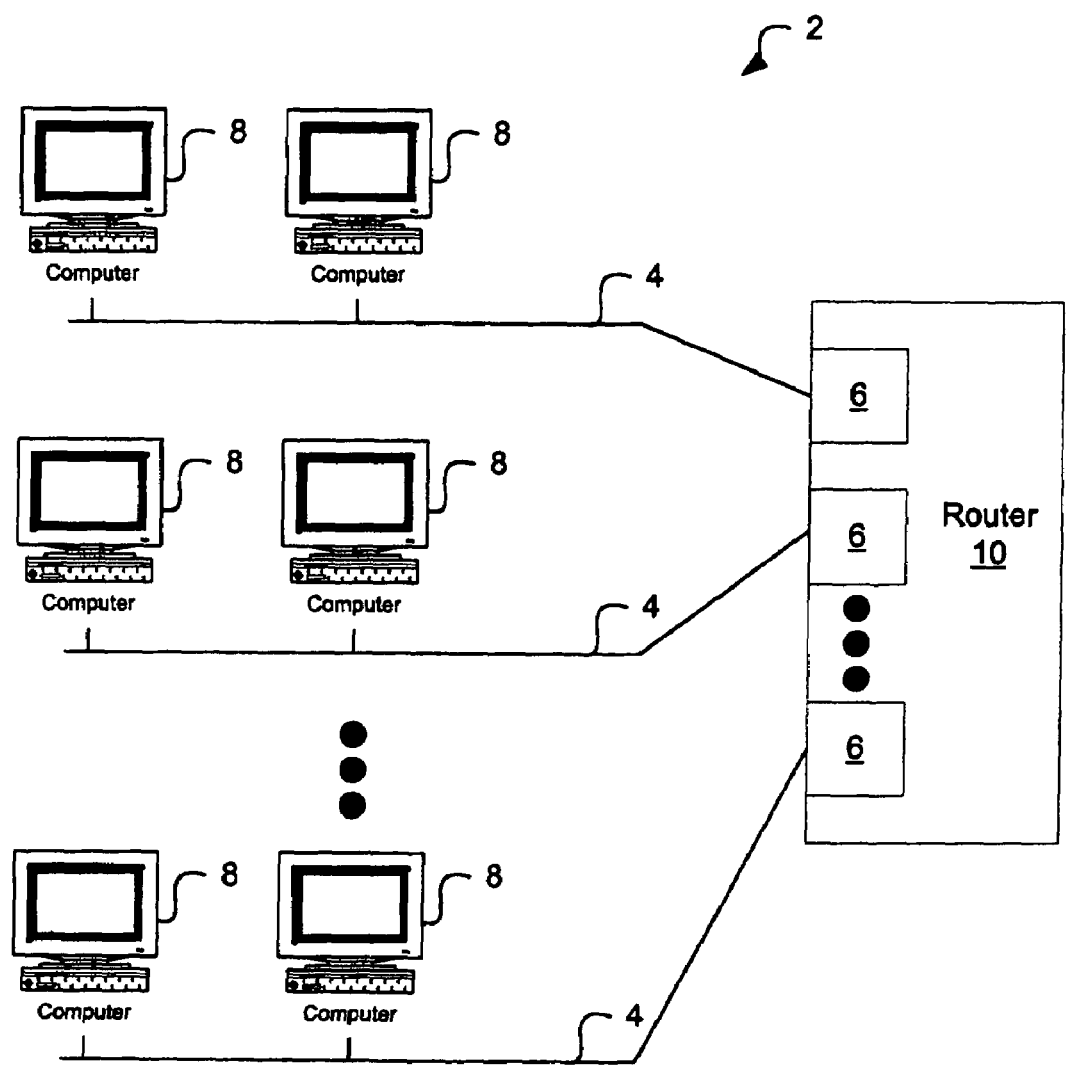
FIG. 1 is a block diagram a network having router interconnecting a number of computers.

FIG. 1 is a high-level block diagram illustrating a system 2 in which a router 10 interconnects a number of computers 8 via network 4. Router 10 includes a number of forwarding interfaces 6 for receiving and transmitting packets over network 8.

Figure 2:
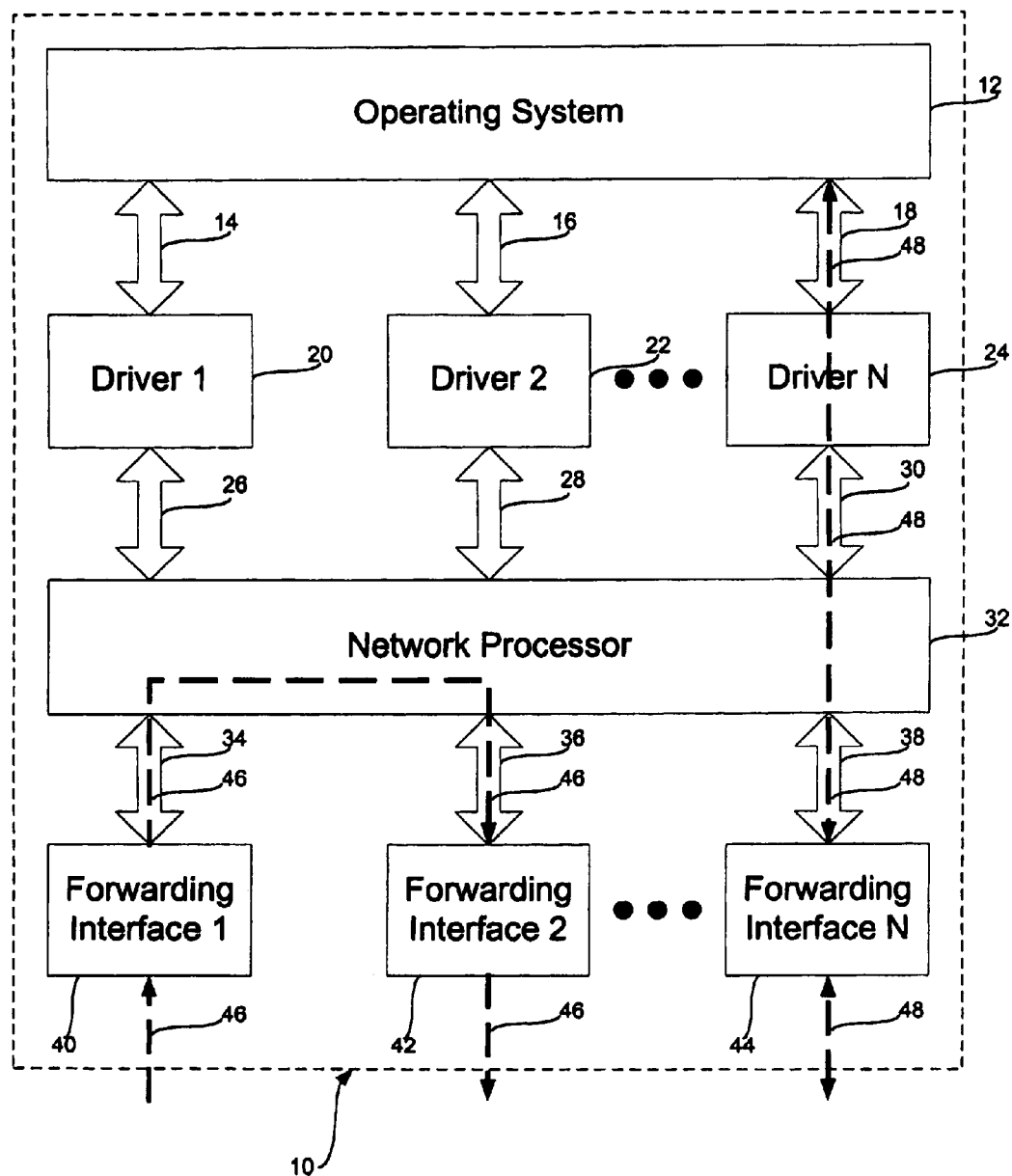
FIG. 2 is a block diagram showing an interface between an operating system and a network processor.

FIG. 2 is a block diagram depicting an example network router 10 and the internal communication paths between an operating system 12 and a network processor 32. The network processor 32 includes N (an arbitrary number of) forwarding interfaces 40, 42 and 44, connected by communication links 34, 36 and 38, respectively. By way of the forwarding interfaces 40, 42 and 44, the network processor 32 receives messages from the network 4 or transmits messages over the network 4. Forwarding interfaces 40, 42 and 44 represent connection ports to other computers 8 in the network 4.

Separate from the network processor 32 is the router's operating system 12, which typically runs on the router's general-purpose processor (not shown). Drivers 20, 22 and 24, also running on the general-purpose processor, act as intermediaries between the operating system 12 and the network processor 32. For each of the forwarding interfaces 40, 42 and 44, the operating system 12 instantiates a corresponding driver. Thus, there are N forwarding interfaces 40, 42 and 44 and N corresponding drivers 20, 22 and 24.

Conventional operating systems include a number of application program interfaces (API's), which are sets of well-defined routines by which software applications interface with the operating system. As such, conventional operating systems typically include an API for network communication, by which the operating system communicates with a driver for a network interface card (NIC). In FIG. 1, however, no NIC's are present in the router 10 because the network processor 32 handles network communications. Drivers 20, 22 and 24, however, register with the operating system 12 as NIC device drivers and present a conventional interface to operating system 12. In this fashion, as described in detail below, router 10 supports the use of a dedicated network processor 32 yet provides a conventional interface to operating system 12.

When a driver registers with the operating system 12, the driver receives a routine from the operating system that the driver can call when the driver needs to deliver a control information packet to the operating system. The driver also provides a routine to the operating system 12 that the operating system can call when the operating system needs to deliver a control information packet to the network. The driver further informs the operating system 12 of the port or forwarding interface to which the driver corresponds. Through registration, communication links 14, 16 and 18 are established. The drivers 20, 22 and 24 present themselves to the operating system 12 as drivers for a network device, such as a driver for a NIC. Because the drivers 20, 22 and 24 appear to the operating system 12 as device drivers, the drivers 20, 22 and 24 can take advantage of API's for drivers already existing in the operating system 12.

Drivers 20, 22 and 24 also register with the network processor 32, and establish communication links 26, 28 and 30, respectively. Drivers 20, 22 and 24 present themselves to the network processor 32, not as drivers, but rather as forwarding interfaces. To the network processor 32, drivers 20, 22 and 24 appear just like forwarding interfaces 40, 42 and 44. Control information to be sent from the network processor 32 to the operating system 12 is passed to a driver 20, 22 or 24, just as if the network processor 32 were forwarding the data along the network. The network processor 32 can use its own existing forwarding mechanisms to pass data to a driver 20, 22 or 24, which may then relay the data to the operating system 12.

Control information issuing from the operating system 12 can be relayed to the network processor 32 or to a forwarding interface 40, 42 or 44 by way of a driver 20, 22 or 24. The control information arrives in the network processor 36 like other data received from forwarding interfaces 40, 42 and 44. The network processor 32 then passes the information along the network by way of a forwarding interface 40, 42 or 44.

FIG. 2 illustrates an exemplary path 46 by which a general data packet is forwarded through the router 10. In FIG. 2, the general data packet is received at a first forwarding interface 40, which is then communicated 34 to the network processor 32. Because the general data packet includes no control information, the network processor 32 can ordinarily forward 36 the data to a second forwarding interface 42, for transmission along the network. In a simple forwarding operation, no intervention by the operating system 12 is required.

FIG. 2 also illustrates an exemplary path 48 of control information through the router 10. Control information may both be received by the operating system 12 from the network and sent from the operating system 12 by control information packets. When forwarding interface 44 receives a control information packet, the control data packet contained therein is communicated to the network processor 32. Control information entails the support of the operating system 12, so the network processor 32 can forward the control information to a driver 24, which then relays the control information to the operating system 12. Control information packets from the operating system 12 follow the reverse path, being communicated to the driver 24, which then forwards the control data packet to the network processor 32. The network processor 32 may then send the control information packet to a forwarding interface 44 for transmission along the network.

Protocols for driver API's vary from operating system to operating system. Similarly, protocols for forwarding interfaces vary from network processor to network processor. A driver may be created, however, to adapt an operating system with a driver API to a network processor supporting a forwarding interface. No modification of the operating system or network processor is needed.

Figure 3:
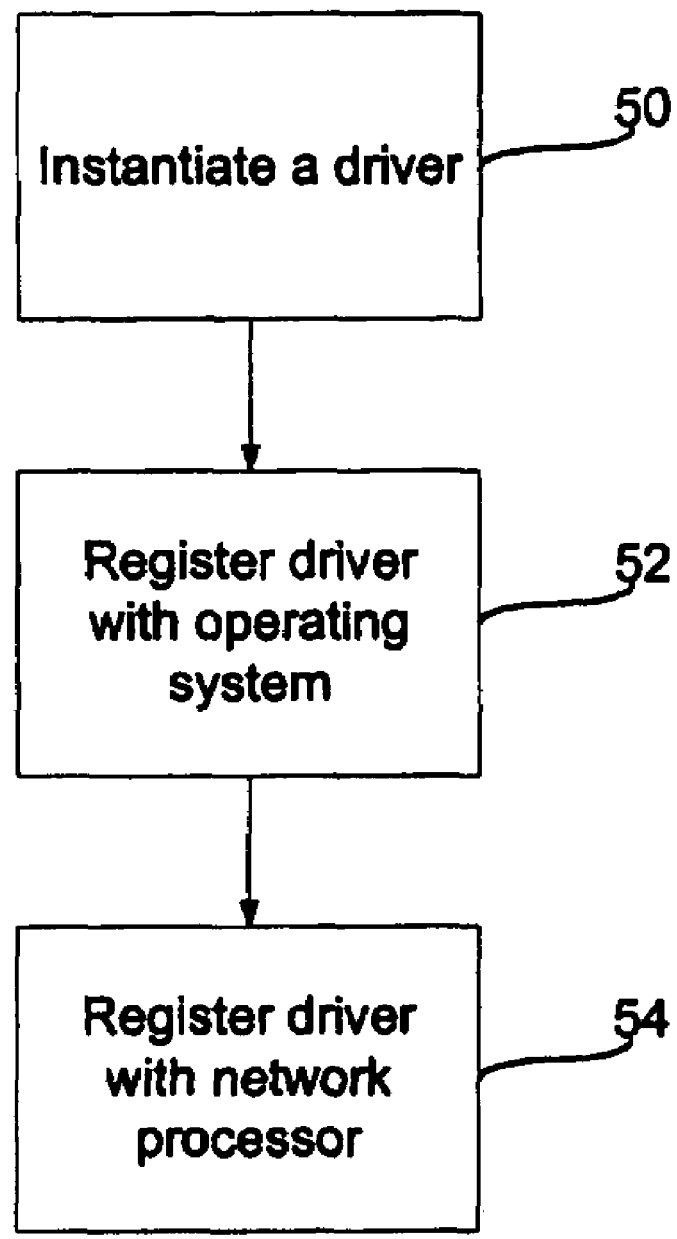
FIG. 3 is a flow chart illustrating an embodiment of the invention.

FIG. 3 is a flow chart showing the steps for loading a driver. The driver itself is software, which may be stored in a computer system on any machine-readable medium such as a magnetic disk or optical drive, or may be stored within non-volatile memory such as read-only memory (ROM). An instance of a driver is to be created for each forwarding interface. This is accomplished by instantiating the driver on the general-purpose processor (50). The driver is registered with the operating system 12 so that the operating system's API will recognize the driver as a network device driver and so that communication with the operating system will be established (52). The driver is also registered with the network processor 32 so that the network processor will recognize the driver as a valid forwarding interface and so that communication with the network processor will be established (54).

Figure 4:
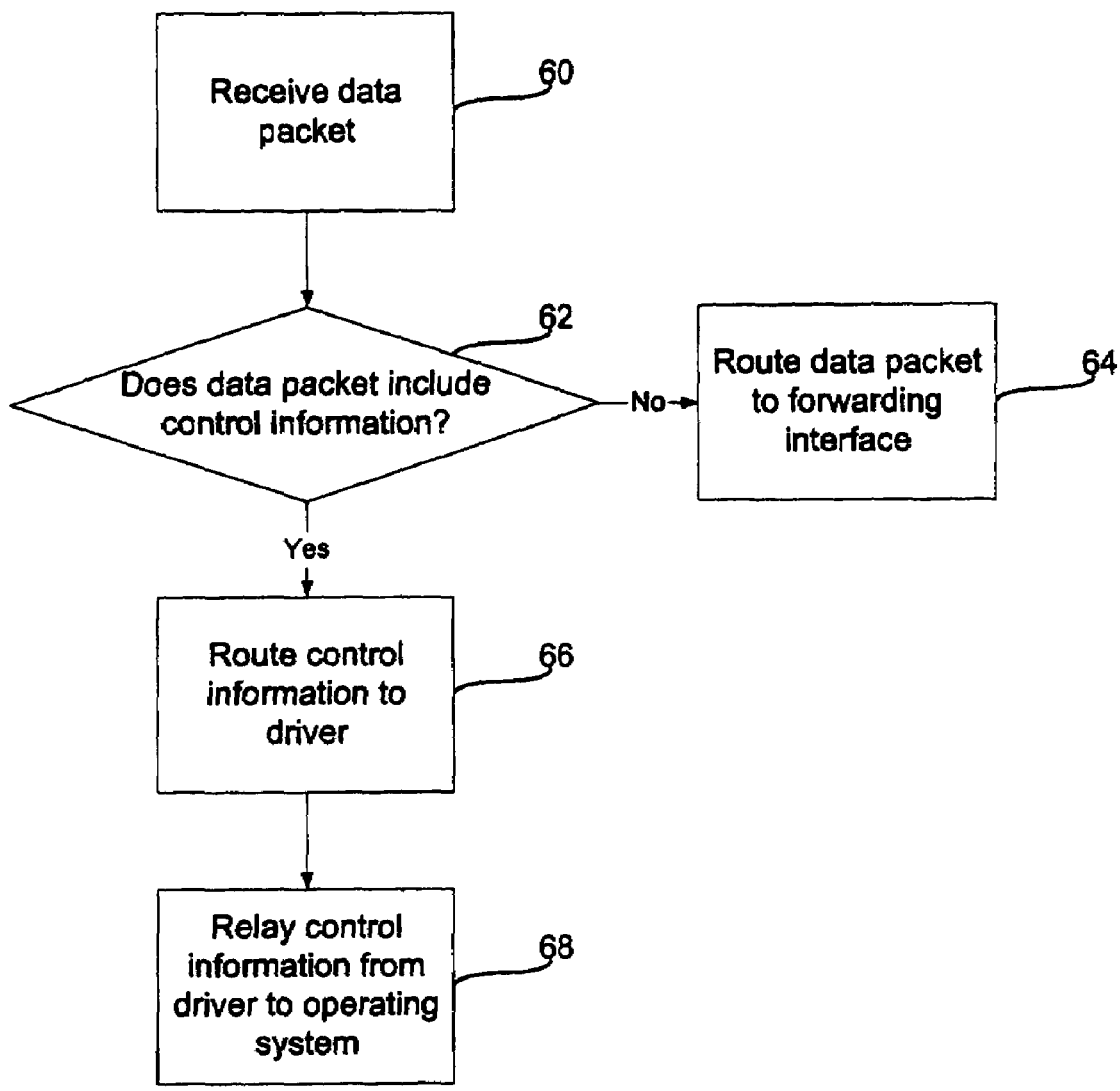
FIG. 4 is a flow chart illustrating an embodiment of the invention.

FIG. 4 is a flow chart showing the steps for forwarding control information to the operating system 12. When the network processor 32 receives a data packet via a forwarding interface (60), the network processor 32 evaluates the data packet and determines whether it contains control information requiring the support of the operating system 12 (62). If no support of the operating system 12 is required, the network processor 32 routes he data packet to a forwarding interface (64) without involving the operating system. If the data packet includes control information, however, the network processor 32 forwards the control information to a driver (66). The driver will then relay the control information to the operating system 12 (68). Relaying the control information can involve some reformatting of the information, i.e., putting the information in a form more useful to the operating system 12.

Figure 5:
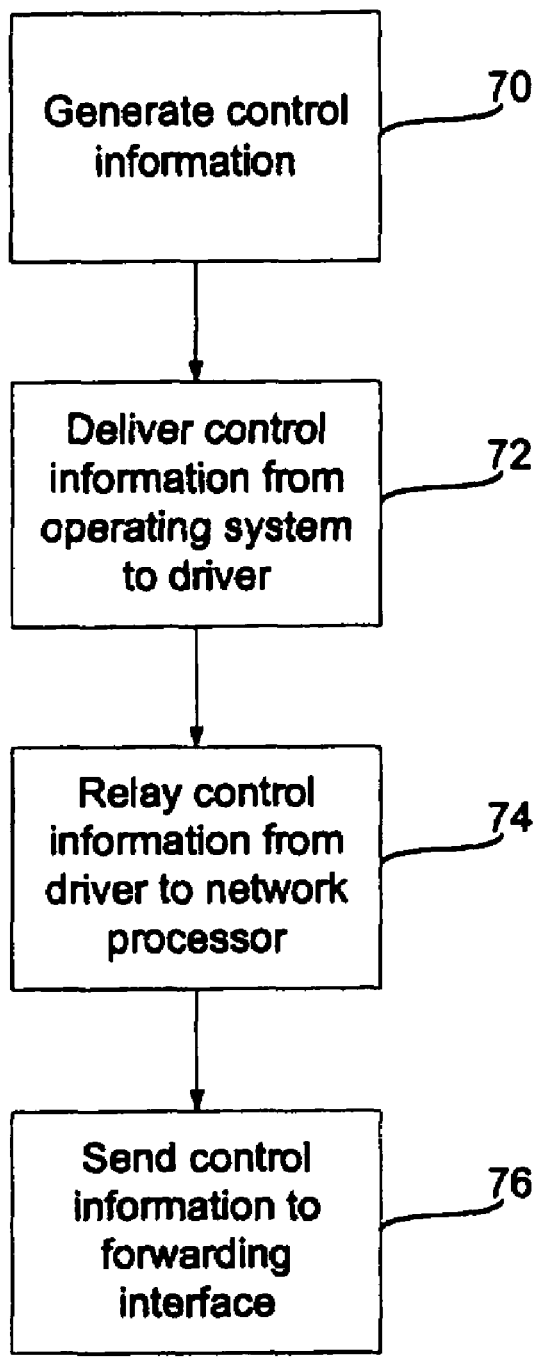
FIG. 5 is a flow chart illustrating an embodiment of the invention.

FIG. 5 is a flow chart showing the steps for passing control information from the operating system 12. The operating system 12 generates a control information packet (70), such as a router-to-router communication, and calls the routine that delivers the information to a driver (72). The driver in turn passes the control information packet to the network processor 32 (74), which sends the control information packet on the network 4 by way of the appropriate forwarding interface (76).

In a router with multiple forwarding interfaces, there are multiple drivers, one corresponding to each forwarding interface. The operating system selects for delivery of the control information the driver that corresponds to the forwarding interface that connects to the desired network port.

Other embodiments are within the scope of the following claims.

What is claimed is:

1. A method, comprising:
   receiving a data packet transmitted over a network from a source device to a destination device;
   detecting whether there is control information in the data packet;
   delivering, when there is control information in the data packet, the control information from a network processor to an operating system by way of a non-invasive driver configured to communicate between the operating system and the network processor; and
   forwarding the data packet to the destination device on the network when there is no control information in the data packet.

2. The method of claim 1, wherein the operating system includes an application programming interface (APT) for network communications, and further wherein the non-invasive driver communicates with the API included in the operating system.

3. The method of claim 1, wherein the non-invasive driver appears to the operating system as a network interface device driver.

4. The method of claim 1, wherein the non-invasive driver appears to the network processor as a forwarding interface.

5. An article comprising a computer-readable medium which stores computer-executable instructions for memory accessing, the instructions causing a computer to:
   receive a data packet transmitted over a network from a source device to a destination device;
   detect whether there is control information in the data packet;

deliver, when there is control information in the data packet, the control information from a network processor to an operating system by way of a non-invasive driver configured to communicate between the operating system and the network processor; and forward the data packet to the destination device on the network when there is no control information in the data packet.

6. The article of claim 5, wherein the operating system includes an API for network communications, and further wherein the non-invasive driver communicates with the API included in the operating system.

7. The article of claim 5, wherein the non-invasive driver appears to the operating system as a network interface device driver.

8. The article of claim 5, wherein the non-invasive driver appears to the network processor as a forwarding interface.

9. A driver configured to communicate between an operating system and a network processor, comprising:

an operating system interface configured to appear to the operating system as a network interface device driver; and a network processor interface configured to appear to the network processor as a forwarding interface.

10. The driver of claim 9, wherein the driver is configured to take advantage of an API in the operating system.

* * * * *